US009617933B2

(12) United States Patent
Liu et al.

(10) Patent No.: US 9,617,933 B2
(45) Date of Patent: Apr. 11, 2017

(54) LOW PRESSURE EGR CONTROL USING THROTTLING

(71) Applicant: BorgWarner Inc., Auburn Hills, MI (US)

(72) Inventors: Xiaobing Liu, Rochester Hills, MI (US); John Shutty, Clarkston, MI (US); B. Jerry Song, Novi, MI (US); Houcine Benali, Braunschweig (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 14/816,679

(22) Filed: Aug. 3, 2015

(65) Prior Publication Data
US 2017/0037797 A1 Feb. 9, 2017

(51) Int. Cl.
*F02M 25/07* (2006.01)
*F02D 41/00* (2006.01)
*F02M 26/48* (2016.01)
*F02M 26/64* (2016.01)
*F02D 21/08* (2006.01)

(52) U.S. Cl.
CPC ......... *F02D 41/0052* (2013.01); *F02M 26/48* (2016.02); *F02M 26/64* (2016.02); *F02D 2021/083* (2013.01)

(58) Field of Classification Search
CPC ........... F02D 41/0052; F02D 2021/083; F02D 41/007; F02D 2041/002; F02D 2041/0017; F02D 2041/0015; F02M 26/64; F02M 26/48; F02M 26/02; F02M 26/09; F02M 26/13; F02M 25/0744; F02M 25/0745; F02M 25/0792; F02M 29/06

USPC .......... 123/568.12, 568.17, 568.18, 568.19, 123/568.2, 568.21, 590, 592, 562, 564, 123/566; 701/103, 108; 60/605.1, 605.2, 60/600, 602
See application file for complete search history.

(56) References Cited

U.S. PATENT DOCUMENTS

| 6,273,056 B1* | 8/2001 | Shirakawa | F02M 26/28 123/305 |
| 6,289,883 B1* | 9/2001 | Wakutani | F02D 21/08 123/399 |
| 7,206,688 B2* | 4/2007 | Wang | F02D 35/02 123/295 |
| 7,801,669 B2* | 9/2010 | Nagae | F01N 3/021 123/559.1 |
| 8,499,558 B2* | 8/2013 | Muenz | F02B 37/225 60/605.1 |
| 8,706,385 B2* | 4/2014 | Nakayama | F02D 41/0072 123/568.11 |
| 2010/0199639 A1* | 8/2010 | Matsunaga | F01N 3/0842 60/278 |
| 2010/0205949 A1* | 8/2010 | Bolda | B01D 46/12 60/309 |

(Continued)

FOREIGN PATENT DOCUMENTS

| JP | 2010-242681 | * 10/2010 | F02M 25/07 |
| JP | 5045689 | * 7/2012 | F02D 41/00 |

(Continued)

*Primary Examiner* — Hai Huynh
(74) *Attorney, Agent, or Firm* — BrooksGroup

(57) ABSTRACT

A number of variations may include a method including controlling low pressure EGR flow rates using air intake throttle with a variable swirl device or throttle valve, or using exhaust throttling.

9 Claims, 7 Drawing Sheets

(56) References Cited

U.S. PATENT DOCUMENTS

| | | | | |
|---|---|---|---|---|
| 2011/0011084 A1* | 1/2011 | Yanagida | ............. | F02M 35/084 60/605.2 |
| 2012/0266594 A1* | 10/2012 | Christmann | ............ | F02B 39/16 60/605.2 |
| 2013/0283788 A1* | 10/2013 | Kobayashi | ......... | F02M 25/0709 60/605.2 |
| 2016/0097351 A1* | 4/2016 | Kiener | ............... | F02M 25/0722 123/568.18 |

FOREIGN PATENT DOCUMENTS

| | | | | |
|---|---|---|---|---|
| JP | 2013-238143 | * | 11/2013 | ............. F02M 25/07 |
| JP | 2013-238144 | * | 11/2013 | ............. F02M 25/07 |
| KR | 100887968 | * | 3/2009 | ......... F02D 41/0052 |
| WO | WO 2013/132589 | * | 9/2013 | ......... F02D 41/0072 |

\* cited by examiner

US 9,617,933 B2

LOW PRESSURE EGR CONTROL USING THROTTLING

TECHNICAL FIELD

The field to which the disclosure generally relates to includes exhaust gas recirculation (EGR) systems and methods of controlling low pressure ERG flow rates using air intake throttle with a variable swirl device or throttle valve, or using exhaust throttling.

BACKGROUND

EGR system may have controls.

SUMMARY OF ILLUSTRATIVE VARIATIONS

A number of variations may include a method including providing a computer/controller constructed and arranged to receive one or more inputs regarding operating conditions of the vehicle or constructed and arranged to generate an input based upon at least one of calculations, look-up tables, or models, utilizing the computer/controller and at least one input from sources external to the computer/controller or an input from the computer/controller to determine whether enough exhaust gas is flowing through a low pressure exhaust gas recirculation conduit of a vehicle system, and in response to the determination, the computer/controller generating at least one output constructed and arranged to alter the amount of exhaust gas flowing through the low pressure exhaust gas recirculation conduit.

A number of variations may include an engine breathing system comprising a variable swirl device positioned in an air intake conduit up stream of the junction of a low pressure EGR conduit and the air intake conduit.

A number of variations may include a method including adjusting the flow of EGR gas through a low pressure EGR conduit by increasing or decreasing the flow of intake air through a variable swirl device positioned in an air intake conduit up stream of the junction of a low pressure EGR conduit and the air intake conduit.

A number of variations may include a method including increasing the flow of EGR gas through a low pressure EGR conduit by throttling the flow of intake air through a variable swirl device positioned in an air intake conduit up stream of the junction of a low pressure EGR conduit and air intake conduit to decrease the pressure of the intake air at the junction of a low pressure EGR conduit and air intake conduit, and to swirl intake air and low pressure EGR gas.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
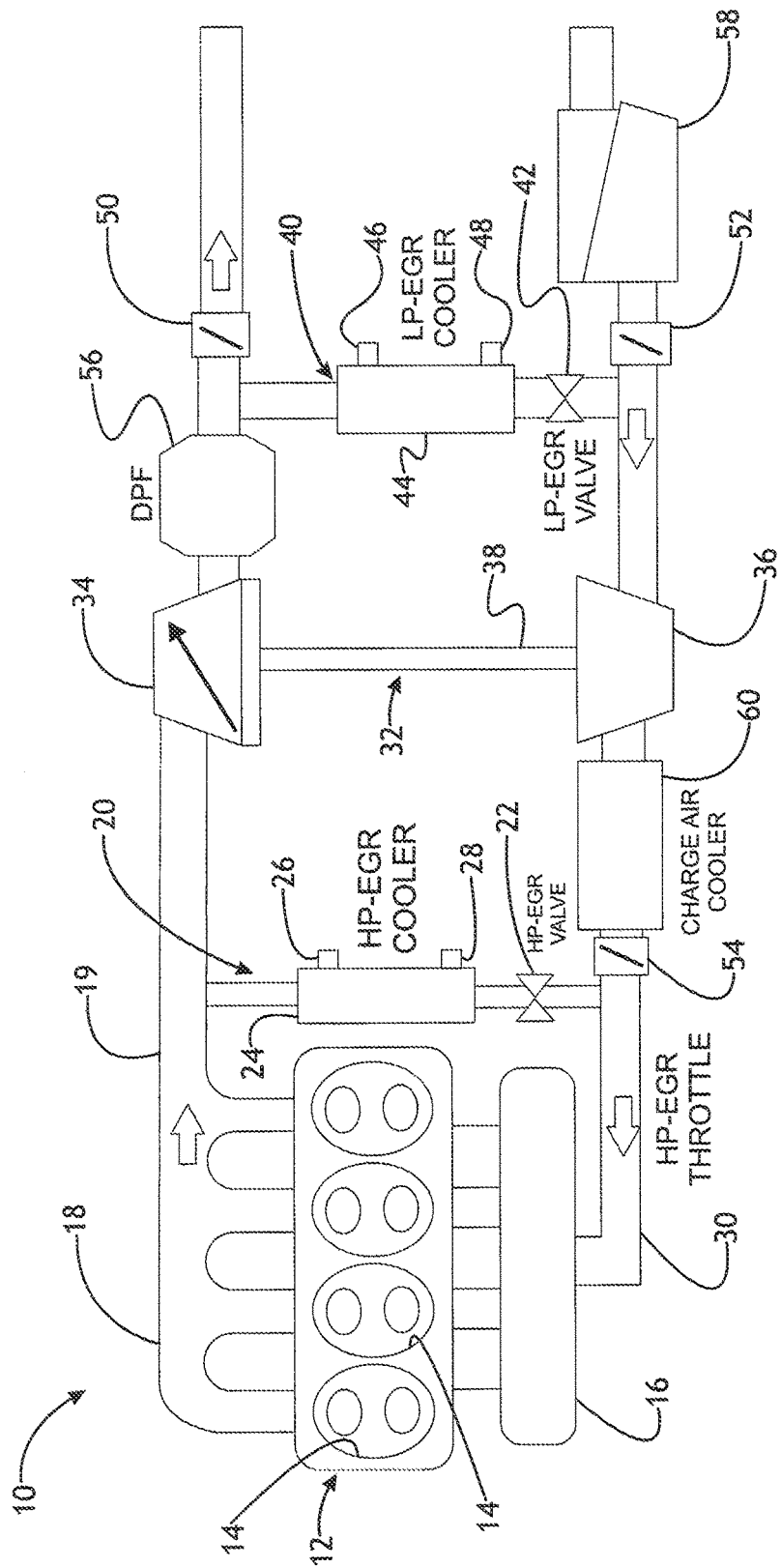
FIG. 1 is a schematic illustration of a vehicle system useful according to a number of variations.
Figure 5:
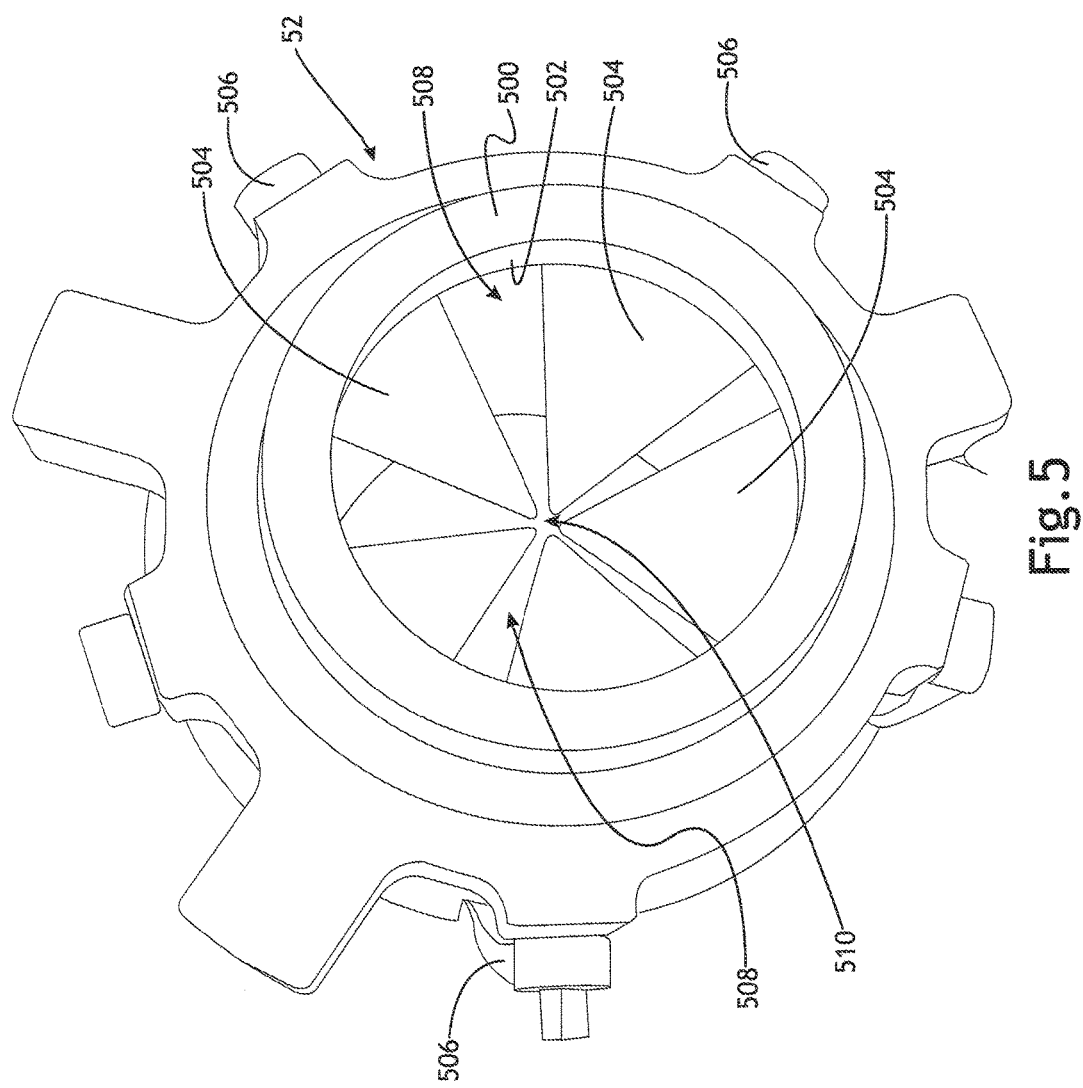
FIG. 5 is a perspective view of a variable intake swirl device in a first open position useful in a number of variations.
Figure 6:
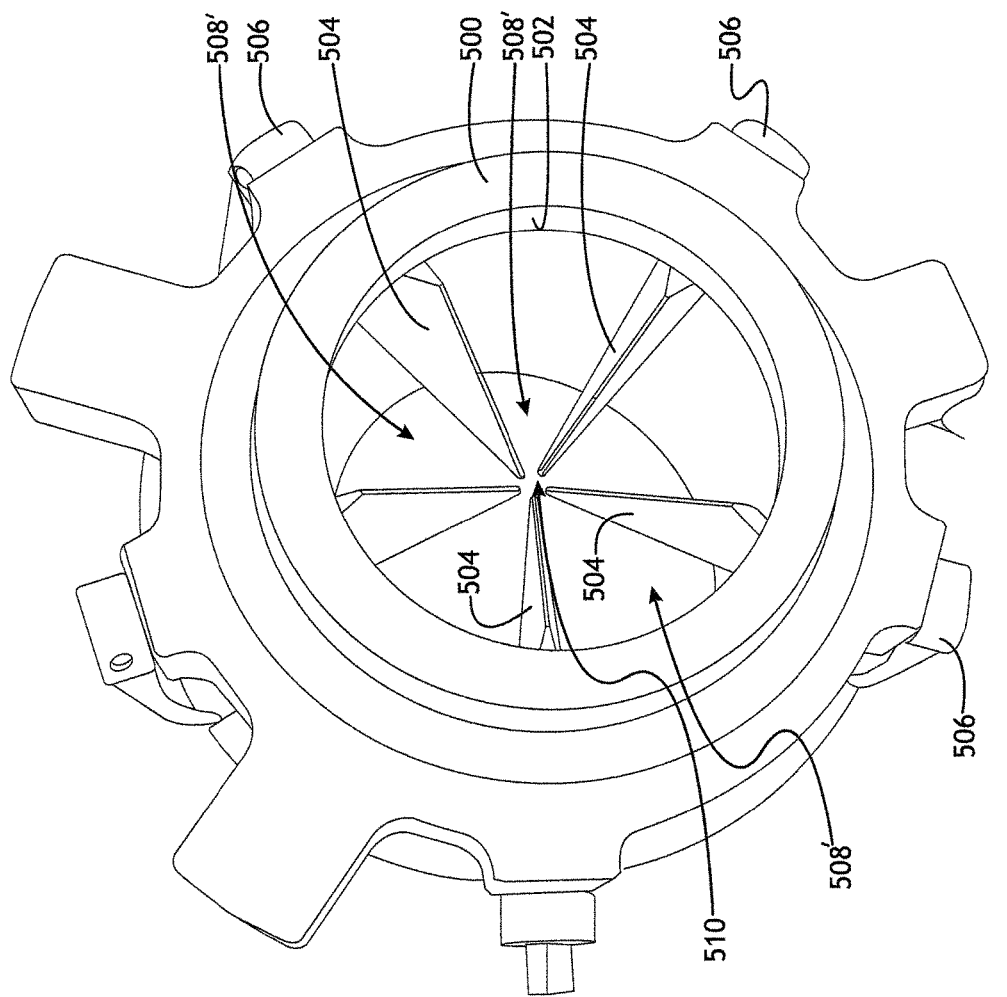
FIG. 6 is a perspective view of a variable intake swirl device in a first open position useful in a number of variations.

Referring to FIG. 1, a number of variations may include a vehicle system 10 which may include an engine 12 having a plurality of combustion chambers 14. An intake manifold 16 may be connected to the engine 12 to deliver air and recirculated exhaust gas into the plurality of combustion chambers 14. An exhaust manifold 18 may be connected to the engine 12 to receive combustion gases exhausted from the plurality of chambers 14. An exhaust gas conduit 19 may be connected to the exhaust gas manifold 18 and may include a plurality of components operatively connected thereto. In a number of variations the system 10 may include a turbocharger 32 having a turbine 34 connected to the exhaust conduit 19. The turbocharger 32 may have a compressor 36 operatively connected to an air intake conduit 30 connected to the air intake manifold 16. In a number of variations a turbocharger shaft 38 may connect the turbine 38 and the compressor 36. Turbochargers without a shaft may be used. A high pressure (HP) exhaust gas recirculation (EGR) conduit 20 may extend from the exhaust conduit 19 (upstream of the turbine 38) to the air intake conduit 30 (downstream of the compressor 36). An HP EGR valve 22 may be provided to control the flow of gas through the HP EGR conduit 20. In a number of variations the HP EGR valve 22 may be positioned in the EGR conduit 20 downstream of an HP EGR cooler 24. The HP EGR cooler 24 may have an inlet 26 and an outlet 28 for the flow of cooling fluid. In a number of variations the HP EGR valve 22 may be a three-way valve and may be connected at the intersection of the exhaust conduit 19 and the HP EGR conduit 20 or at the intersection of the HP EGR conduit 20 and the air intake conduit 30. In a number of variations the system 10 may include a low pressure (LP) EGR conduit 40 connected to the exhaust conduit 19 downstream of the turbine 34 and connected to the air intake conduit 30 upstream of the compressor 36. An LP EGR valve 42 may be provided to control the flow of exhaust gas in the LP EGR conduit 40. In a number of variations the LP EGR valve 42 may be positioned downstream of a LP EGR cooler 44 in the LP EGR conduit 40. The LP EGR cooler 40 may include an inlet 46 and an outlet 48 for the flow of cooling fluid. In a number of variations, an exhaust throttle valve 50 may be positioned in the exhaust conduit 19 downstream of the LP EGR conduit 40. In a number of variations, an air intake throttle valve 52 may be positioned in the air intake conduit 30 upstream of the LP EGR conduit 40. In a number of variations the intake throttle valve 52 may be a butterfly or flapped valve. In a number of variations the intake throttle valve may be a variable swirl device, for example as illustrated in FIGS. 5-6. FIG. 5 illustrates a variable swirl device 52 which may include a housing 500 having a through hole (or bore) 502 formed therein to allow passage of intake air. A plurality of moveable vanes 504 may be pivotally attached to the housing 500 and constructed and arranged so that adjacent vanes nearly touch each other to block the passage of substantially all intake air or at least 50%, 60%, 70%, 80%, 90%, 95%. 99% or any range of percentages therebetween. In a number of variations the vanes may be rotated 360 degrees to produce positive (clockwise) of negative (counter-clockwise) swirl of intake air. Positioning a variable swirl device upstream of the junction of the intake conduit and the LP EGR conduit allows the intake swirl device 52 (or intake swirl throttle) to be used to throttle intake air and to also swirl the intake air with the LG EGR gas for better mixing for more uniform combustion in all cylinders of the engine; provide high turbocharged efficiency; and lower throttle loss than butterfly or plate type intake throttles. FIG. 5 illustrates a variable swirl device with the vanes in a first position wherein there is a first space or opening 508 between adjacent vanes of a first area. FIG. 6 illustrates a variable swirl device with the vanes in a second position wherein there is a second space or opening 508' between adjacent vanes of a second area that is greater than the first area. An actuation mechanism 506 such as a lever arm may be connected to a vane 504 to pivotally move the vane 504. In a number of variations the actuation mechanism 506 may be drive by an electric motor, or pneumatic or hydraulic power. The vanes 504 may have tips that may be arranged to provide a center opening 510.

In a number of variations, the system 10 may include a variety of other components where desired or appropriate, for example but not limited to, a diesel particulate filter 56 connected to the exhaust conduit 19, an air intake filter 58 connected to the air intake conduit 30 and/or an air charge cooler 60 positioned downstream of the compressor 36.

LP EGR relying only on natural pressure differences from the diesel particulate filter 56 to the turbocharger compressor 36 may be limited in flow and can lead to large valve movements or instability in valve control.

A number of variations may be used to solve the following problem: When delta P across EGR valve is small, a large LP EGR valve movement is required to achieve rather small EGR flow change.

$$\dot{m} = CdA(\theta)\sqrt{2\Delta P \rho}$$

Assume the initial conditions are: exhaust throttle fully open, EGR valve fully closed. As the EGR valve gradually opens, more EGR flows through the valve. If EGR valve is fully open, but the desired EGR flow is still not reached, the exhaust throttle opening has to be reduced to reach desired EGR flow. Closing intake throttle or exhaust throttle valve leads to increased delta P across LP EGR valve, then EGR valve opening needs to be reduced. The transition may lead to oscillation of the two valve openings. Coordinate LP EGR valve and intake throttle (or exhaust throttle) actions, leave intake (or exhaust) throttle fully open to reduce throttle loss when LP EGR valve alone can reach the desired EGR flow.

In a number of variations, the system 10 may be constructed and arranged to use exhaust throttling or inlet throttling to actively increase the difference in the pressure in the LP EGR conduit 40 at the intersection of the exhaust conduit 12 to the pressure in the LP EGR conduit 40 at the air intake conduit 30 juncture. A number of variations include control strategies for either exhaust throttling, which is used to raise upstream pressure in the exhaust conduit 19, and/or air intake throttling, which is used to lower the downstream pressure in the LP/EGR path 40 at the juncture of the air intake conduit 30 in order to deliver the required EGR rate with a minimum flow restriction for maximum fuel economy benefit. In a number of variations the air intake throttle may be a variable swirl device located in the air intake conduit upstream of the LP EGR conduit to provide both throttling of intake air and swirling of intake air for better mixing with the LP ERG gas entering the air intake conduit.

Figure 2:
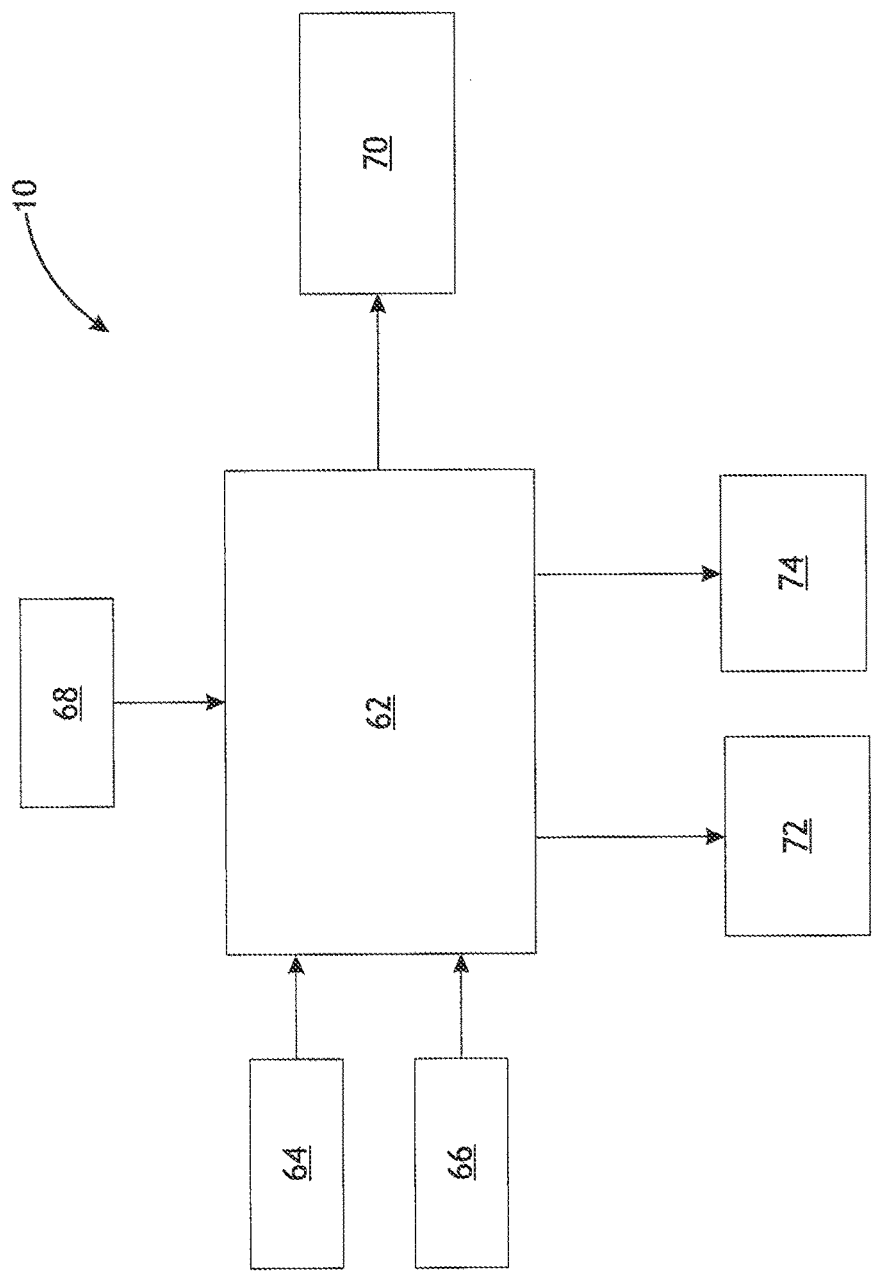
FIG. 2 is a schematic illustration of a system and a method according to a number of variations.

Referring now to FIG. 2, in a number of variations, a vehicle system 10 and method may include providing a electronic control unit (ECU) 62 which may be constructed and arranged to receive one or more inputs regarding operating conditions of the vehicle or may be constructed and arranged to generate an input based upon calculations, look-up tables, models, or the like for use in generating at least one output. In a number of variations, at least a first sensor 64 or second sensor 66 may be provided and may deliver an input to the computer/controller 62 of an actual operating condition of the vehicle or an input indicative of or an estimate of an operating condition of the vehicle. Such operating conditions may include but not limited to engine speed, engine load, one or more environmental constituents in an exhaust path of the vehicle, the mass flow in a LP EGR path, a LP EGR path mass flow set point, a LP EGR downstream pressure, a LP EGR upstream pressure, a LP EGR valve position, an exhaust throttle valve position, an air intake throttle valve position, or other engine operating condition(s). In a number of variations, a first input 68 may be provided to the computer/controller 62 wherein the first input is not from a sensor. In a number of variations, the computer/controller 62 may utilize at least one input 64, 66, 68 from sources external to the computer/controller or an input from the computer/controller 62 itself to determine whether enough exhaust gas is flowing through the LP EGR conduit 40 of a vehicle system 10. In response to the determination, the computer/controller 62 may perform calculations, utilize look-up tables or models to generate at least one output constructed and arranged to alter the amount of exhaust gas flowing through the LP EGR conduit 40. In one variation, the computer/controller 62 may generate an output resulting in movement of the LP EGR valve 42. For example, if the computer/controller 62 determines that there is not enough exhaust gas flowing through the LP EGR conduit 40 to meet a desired engine operating condition, such as exhausting pollutants below a desired level, computer/controller 62 may provide an output to cause the LP EGR valve 42 to be completely open if the LP EGR valve 42 is not completely open. After the computer/controller 62 has determined that the LP EGR valve 42 is at a completely open position or after moving the LP EGR valve 42 to a completely open position, the computer/controller 62 may determine if the desired vehicle operating condition has been met. If the desired operating condition has not been met, or the amount of exhaust gas flowing through the LP EGR conduit 40 is not enough to meet the desired operating condition, the computer/controller 62 may generate an output to move at least one of the exhaust throttle valve 50 or air intake throttle valve 52 to a position restricting the exhaust flow past the exhaust throttle valve 50 or restricting the moving air past the air intake valve 52. In yet another variation, the computer/controller 62 may generate an output to cause the pressure differential across the LP EGR conduit 40 from the exhaust conduit 19 to the air intake conduit 30 to increase.

However, in a number of variations intake or exhaust throttle may be used first followed by moving the LP ERG valve to a completely open position.

In a number of variations, the ECU 62 may include a main computer/controller and/or a control subsystem which may include one or more controllers (not separately illustrated) in communication with the components of the system and/or other components of the vehicle for receiving and processing sensor input and transmitting output signals. The controller(s) may include one or more suitable processors and memory devices (not separately illustrated). The memory may be configured to provide storage of data and instructions that provide at least some of the functionality of the engine system and that may be executed by the processor(s). At least portions of the method may be enabled by one or more computer programs and various engine system data or instructions, vehicle operating condition data stored in memory as look-up tables, formulas, algorithms, maps, models, or the like. The control subsystem may control the parameters of the system by receiving input signals from the sensors, executing instructions or algorithms in light of sensor input signals, and transmitting suitable output signals to the various actuators, and/or components. As used herein, the term "model" may include any construct that represents something using variables, such as a look up table, map, formula, algorithm and/or the like. Models may be application specific and particular to the exact design and performance specifications of any given engine system or of the system. A controller system main controller and/or a control subsystem may include one or more controllers (not separately illustrated) in communication with the components of the system and/or other components of the vehicle for receiving and processing sensor input and transmitting output signals and may be operatively connected valves 42, 50, 52, 22, 54 including, but not limited to, in a method consistent with the illustrated variations described herein.

Figure 3:
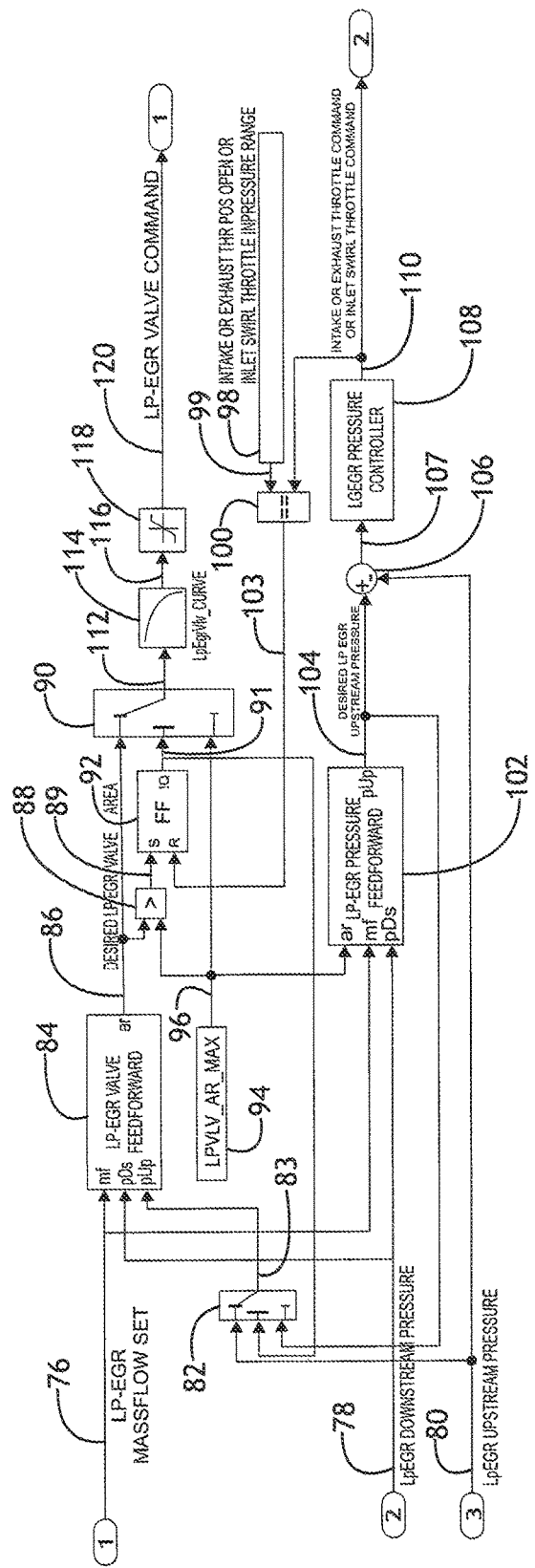
FIG. 3 is a schematic illustration of a method according to a number of variations.

Referring now to FIG. 3, in a number of variations a method may be utilized to control the amount of exhaust gas flowing through a LP EGR conduit 40 between an exhaust conduit 19 and an air intake conduit 30 and may include a number of operations. The method may include operation 84, operation 88, operation 92, operation 90, operation 114, operation 118, operation 82, operation 96, operation 100, operation 98, operation 102, operation 106 and operation 108. Operation 84 may use input 76 regarding a LP mass flow set point, input 78 regarding LP EGR downstream pressure. and input 83 from operation 82. Operation 82 may perform the function of switching the input signal 83 of the LP EGR downstream pressure based on the LP EGR valve status. Using input 104 regarding a desired LP EGR upstream pressure from operation 102, input 91 from operation 92 and input 80 regarding LP EGR upstream pressure. When the valve is locked in its fully open (input signal 91), the target LP EGR upstream pressure from operation 104 is used for operation 84 which keeps calculating a fully open LP EGR valve as long the desired LP EGR pressure i.e the LP EGR mass flow is not reached and thus do not interact with operation 102 which controls now the LP EGR upstream pressure. Operation 88 may receive input 86 regarding a desired LP EGR valve area from operation 84 and also receive input 96 from operation 94 regarding the LP valve maximum area. LP EGR valve area means cross-section area of LP EGR valve opening. Operation 92 may receive input 89 from operation 88 and input 103 from operation 100. Operation 90 may receive input 86 from operation 84, input 91 from operation 92, and input 96 from operation 94. Operation 90 may perform the function of whether LP EGR valve should be fully open. Operation 114 may receive input 112 from operation 90. Operation 114 may perform the function of converting LP EGR valve area into valve opening angle or command duty cycle. Operation 118 may receive input 116 from operation 114. Operation 118 performs a function of limiting the valve opening angle within min/max. Operation 118 may provide output 120 regarding a LP EGR valve command to move the LP EGR valve 42 (shown in FIG. 1). Operation 102 may receive input 96 regarding a LP valve maximum area, input 76 regarding the LP EGR mass flow set point, and input 78 regarding the LP EGR downstream pressure. Low pressure valve maximum area means cross-section area when the valve is fully open. Operation 102 may perform the function of calculation of desired LP EGR upstream pressure to reach desired EGR mass flow rate with maximum valve area and downstream pressure given. It is used as feed forward control. Operation 106 may receive input 104 from operation 102 and input 80 regarding the LP EGR upstream pressure. Operation 106 may perform the function of calculation of the error between measured and desired LP EGR upstream pressure. Operation 108 may receive input 107 from operation 106. The function of operation 108 is feedback controller to achieve desired LP EGR pressured. Operation 108 may produce output 110 which may be an air exhaust throttle command to move the air exhaust throttle valve 50. Analog to this the intake throttle command could be generated by the same approach with the difference when the intake air is commanded the LP EGR downstream pressure is controlled by operation 108 with feedback signal 78, the target in this case the "downstream pressure 104" is calculated by 102. Operation 84 receives analog to operation 82 either the target (104) or actual (78) value of the downstream pressure. Operation 100 may receive input 99 from operation 98 and input 110 from operation 108. is the intake or exhaust throttle fully open position. The function of operation 100 is to check if intake or exhaust throttle is at fully open position. The output 103 from operation 100 may be provided as an input to operation 92. The method illustrated in FIG. 3 may provide the advantages of decoupling the LP EGR valve feedforward operation 84 from the operation 108 and allows thus a sequential operation of the valve and throttle. The LP EGR valve is used as long it can provide the desired LP EGR flow and in this case the throttle (either intake or exhaust) is set at fully open position and prevent producing unnecessary back pressure after turbine or vacuum pressure pre compressor. Once the LP EGR valve is not able to provide desired LP EGR flow, it stay at it fully open position and thus maximum cross area and less restriction at conduit 40. Either the intake or exhaust throttle is responsible to set the target pressure drop over LP EGR path as needed to conduct target LP EGR flow with least loses since less restriction loses and appropriate pressure drop.

In the LP EGR control method illustrated by FIG. 3 both feed forward and feedback (typically PI) control are used. Feed forward valve position is based on desired flow and delta P across the EGR valve. The LP EGR valve upstream pressure may be measured value, or desired value. Using desired upstream pressure value can reduce valve position oscillations, e.g., saturations of LP EGR valve.

Figure 4:
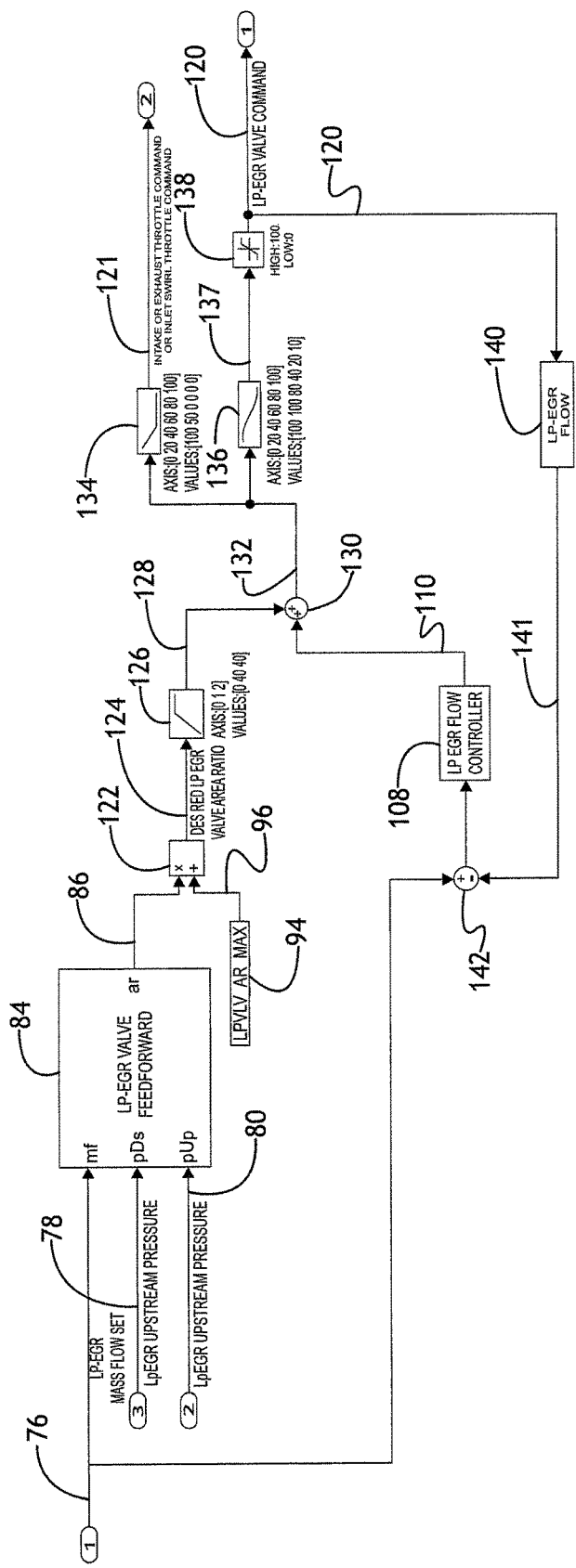
FIG. 4 is a schematic illustration of a method according to a number of variations.

Referring now to FIG. 4, in a number of variations a method of controlling LP EGR may include a number of operations including operation 84, operation 94, operation 122, operation 126, operation 130, operation 134, operation 136, operation 138, operation 140, operation 142, and operation 108. Operation 84 may receive input 76 regarding a LP EGR mass flow set point, input 78 regarding LP EGR downstream pressure, and input 80 regarding LP EGR upstream pressure. Operation 84 may perform the function of calculation of desired EGR valve opening area to achieve LP EGR massflow setpoint with upstream and downstream pressure given, used as feed forward control. Operation 122 may receive input 86 from operation 84 and input 96 from operation 94 regarding the LP valve maximum area. Operation 122 may perform the function of normalizing the valve opening area by dividing the max valve area. Operation 126 may receive input 124 from operation 122. Operation 126 performs the function of convert the valve opening ratio range into the controller output range. The EGR flow controller output is in the range between [0 100], where 0 means no EGR and 100 maximum EGR. Converting the feedforward value from [0 1] to the controller signal range, where the LP EGR Valve operation is desired for example to [0 50] of the total EGR flow control output. This allows the LP EGR feedforward value to be forwarded direct to the total controller output command and used in addition to the feedback control. Operation 30 may receive input 128 from operation 126 and input 110 from operation 108. Operation 108 may perform the function of feedback control to achieve the LP EGR mass flow setpoint. Operation 130 may perform the function of sum up outputs from both feed forward and feedback controllers. Operation 134 may receive input 132 from operation 130. Operations 134 and 136 may perform the function of splitting controller outputs to throttle command and EGR valve command. Operation 134 may generate output 121 which may be an air intake valve throttle or exhaust throttle valve command to move the air intake valve 52 or the exhaust throttle valve 50. Operation 136 may receive input 132 and generate the LP EGR valve command. Operation 138 may receive input 137 from operation 136. Operation 138 may perform the function of limiting the EGR valve command to min/max values. Operation 138 may provide output 120 which may be a LP EGR valve command to move the LP EGR valve. Operation 140 may receive input 120 from operation 138. Operation 140 may perform the function of estimating the LP EGR flow based on EGR valve opening and other inputs (e.g. upstream/downstream EGR pressures) not shown in the figure. Operation 142 may receive input 141 from operation 140, and input 76 regarding the LP EGR mass flow set point. The method illustrated by FIG. 4 may provide the advantages of controlling the LP EGR flow and compensate for any disturbance limiting the desired EGR flow to be reached and either upstream/downstream pressure valve opening. The total EGR flow controller generates an normalized output and reducing locking logic. With splitting curves/maps an actuator individual adjustment could be calibrated to reflect actuators performance/behavior In the variation of LP EGR control illustrated by FIG. 4, both feed forward and feedback (typically PI) control are used. Feed forward valve position is based on desired flow and delta P across the EGR valve. The delta P may be measured value, or estimated based on target EGR flow and engine operating conditions. The two curves shown on top right of FIG. 4 were adopted to smooth the transition from intake (or exhaust) throttle fully open to partially close. When LP EGR valve is close to fully open, intake (or exhaust) throttle begins to close to increase the delta P across EGR valve to achieve desired EGR flow. The control strategy illustrated in FIG. 4 may be used achieve low throttle loss and minimal oscillation of valve actuation. Both control strategies as illustrated in FIGS. 3-4 also apply to LP EGR systems with exhaust throttle in place of intake throttle.

Figure 7:
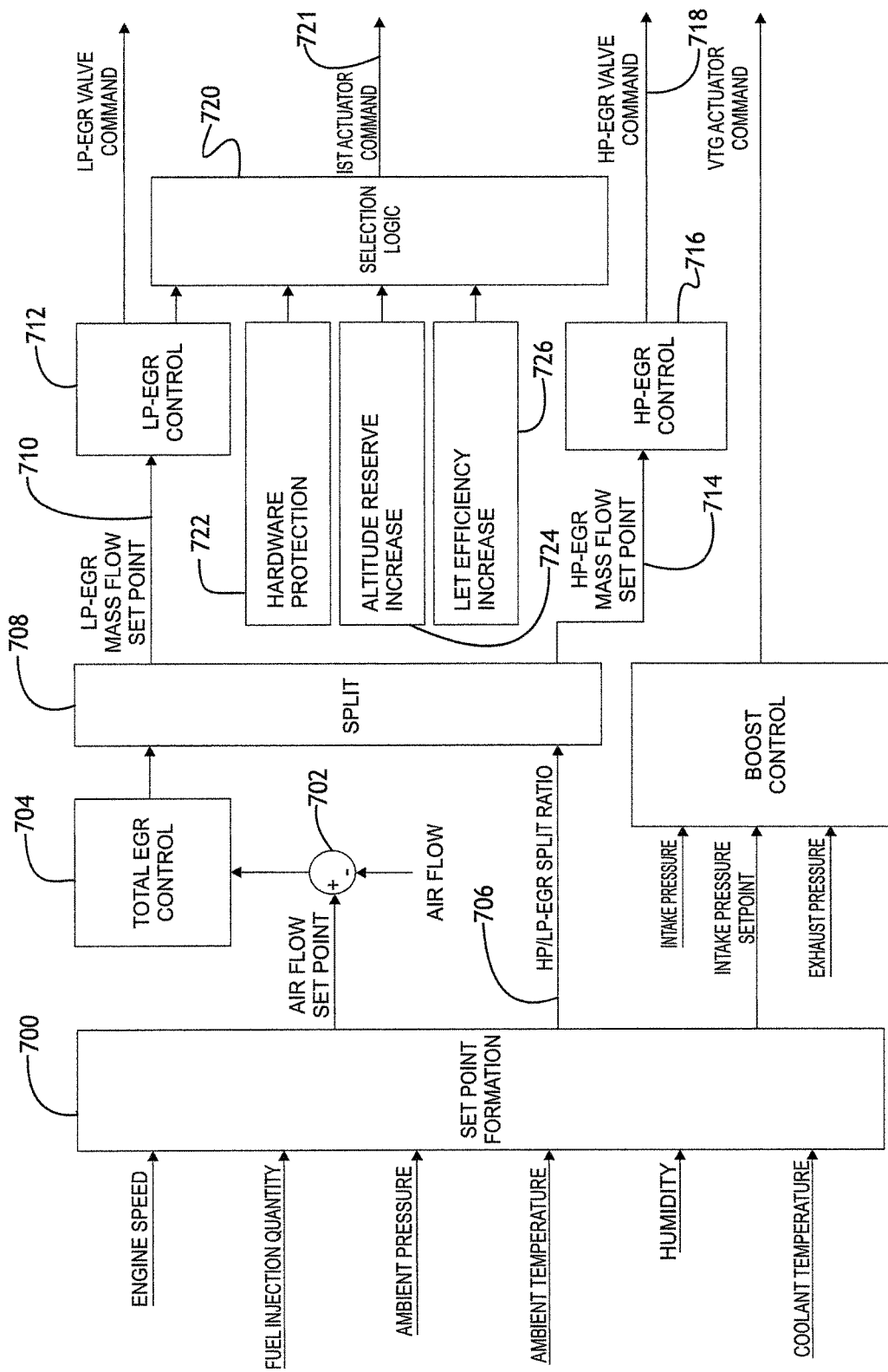
FIG. 7 is schematic illustration of a system and a method according to a number of variations.

FIG. 7 illustrates another variation of a method of controlling LP EGR flow rates wherein the any of a number of vehicle operating perameters such as, but not limited to, engine speed, fuel injection quality, ambient pressure, ambient temperature, humidity, coolant temperature may be used by the ECU for set point formation 700 and an air flow set point 702 determined therefor. The air flow set point may be used to total EGR control 704 wherein a HP/LP EGR split ratio is determine operation 706. The ECU may determine a split 708 of the HP ERG and LP EGR and may use a LP EGR mass flow set point 710 for LP EGR control 721, and the ECU may use a HP EGR mass flow set point 714 for HP EGR control 716 to generate/send a HP ERG valve command to move the HP EGR valve. The ECU may execute detection logic using inputs related to, but is not limited to, protecting hardware 722, altitude reserve increase 724, low end torque efficiency increase or any of a number of other parameters of vehicle operation concerns. Based on vehicle operation parameters the ECU may generate/send a command (IST actuator command) to the variable intake swirl device 52 to move the vanes 504 to throttle air intake and at the same time swirl intake air and LP EGR gas being delivered to the compressor 36 of the turbocharger 32.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a method including providing a computer/controller constructed and arranged to receive one or more inputs regarding operating conditions of the vehicle or constructed and arranged to generate an input based upon at least one of calculations, look-up tables, or models, and utilizing the computer/controller and at least one input from sources external to the computer/controller or an input from the computer/controller to determine whether enough exhaust gas is flowing through a low pressure exhaust gas recirculation conduit of a vehicle system, and in response to the determination, the computer/controller generating at least one output constructed and arranged to alter the amount of exhaust gas flowing through the low pressure exhaust gas recirculation conduit.

Variation 2 may include a method as set forth in Variation 1 wherein the generating at least one output results in movement of a low pressure exhaust gas recirculation valve.

Variation 3 may include a method as set forth in Variation 1 wherein if the computer/controller determines that there is not enough exhaust gas flowing through the low pressure exhaust gas recirculation conduit meet a desired engine operating condition, the generating at least one output results in an LP EGR valve being to move to a completely open position.

Variation 4 may include a method as set forth in Variation 1 further comprising using the computer/controller to determine if a low pressure exhaust gas recirculation valve is in a completely open position, and if the low pressure exhaust gas recirculation valve is in a completely open position the generating at least one output constructed and arranged to alter the amount of exhaust gas flowing through the low pressure exhaust gas recirculation conduit comprises moving at least one of an exhaust throttle valve to a position restricting the exhaust flow past the exhaust throttle valve or moving an air intake throttle valve to restrict air moving air past the air intake valve.

Variation 5 may include a method as set forth in Variation 1 wherein if the computer/controller determines that there is not enough exhaust gas flowing through the low pressure exhaust gas recirculation conduit to meet a desired engine operating condition, the generating at least one output produces results an increase in the pressure differential across the low pressure exhaust gas recirculation conduit from an exhaust conduit to an air intake conduit.

Variation 6 may include an engine breathing system comprising a variable swirl device positioned in an air intake conduit up stream of the junction of a low pressure EGR conduit and the air intake conduit.

Variation 7 may include a method comprising adjusting the flow of EGR gas through a low pressure ERG conduit by increasing or decreasing the flow of intake air through a variable swirl device positioned in an air intake conduit up stream of the junction of a low pressure EGR conduit and the air intake conduit.

Variation 8 may include a method comprising increasing the flow of EGR gas through a low pressure ERG conduit by throttling the flow of intake air through a variable swirl device positioned in an air intake conduit up stream of the junction of a low pressure EGR conduit and air intake conduit to decrease the pressure of the intake air at the junction of a low pressure EGR conduit and air intake conduit, and to swirl intake air and low pressure EGR gas.

The above description of select variations within the scope of the invention is merely illustrative in nature and, thus, variations or variants thereof are not to be regarded as a departure from the spirit and scope of the invention.

What is claimed is:

1. A method comprising:
providing a computer/controller constructed and arranged to receive one or more inputs regarding operating conditions of the vehicle or constructed and arranged to generate an input based upon at least one of calculations, look-up tables, or models;
and utilizing the computer/controller and at least one input from sources external to the computer/controller or an input from the computer/controller to make a first determination as to whether enough exhaust gas is flowing through a low pressure exhaust gas recirculation conduit of a vehicle system, and if there is not enough exhaust gas flowing through a low pressure exhaust gas recirculation conduit of a vehicle system making a second determination as to whether a low pressure exhaust gas recirculation valve is completely open, and in response to at least one of the first determination or second determination, the computer/controller generating at least one output constructed and arranged to alter the amount of exhaust gas flowing through the low pressure exhaust gas recirculation conduit.

2. A method as set forth in claim 1 wherein the generating at least one output results in movement of the low pressure exhaust gas recirculation valve.

3. A method as set forth in claim 1 wherein if the computer/controller determines that there is not enough exhaust gas flowing through the low pressure exhaust gas recirculation conduit to meet a desired engine operating condition, the generating at least one output results in the low pressure EGR valve being moved to a completely open position.

4. A method as set forth in claim 1 further comprising using the computer/controller to determine if the low pressure exhaust gas recirculation valve is in a completely open position, and if the low pressure exhaust gas recirculation valve is in a completely open position the generating at least one output constructed and arranged to alter the amount of exhaust gas flowing through the low pressure exhaust gas recirculation conduit comprises moving at least one of an exhaust throttle valve to a position restricting the exhaust flow past the exhaust throttle valve or moving an air intake throttle valve to restrict air moving past the air intake valve.

5. A method as set forth in claim 1 wherein if the computer/controller determines that there is not enough exhaust gas flowing through the low pressure exhaust gas recirculation conduit to meet a desired engine operating condition, the generating at least one output produces an increase in the pressure differential across the low pressure exhaust gas recirculation conduit from an exhaust conduit to an air intake conduit.

6. A method as set forth in claim 1 further comprising using the computer/controller to determine if the low pressure exhaust gas recirculation valve is in a completely open position, and if the low pressure exhaust gas recirculation valve is in the completely open position the generating at least one output constructed and arranged to alter the amount of exhaust gas flowing through the low pressure exhaust gas recirculation conduit comprises restricting air moving past the air intake valve through a variable swirl device positioned in an air intake conduit up stream of the junction of a low pressure EGR conduit and the air intake conduit.

7. A method comprising adjusting the flow of EGR gas through a low pressure ERG conduit comprising: using a low pressure EGR valve and a variable swirl device, wherein the variable swirl device is positioned in an air intake conduit up stream of a junction of a low pressure EGR conduit and the air intake conduit; determining a flow of exhaust gas through the low pressure EGR conduit and whether the low pressure EGR valve is in a fully open position, and if the flow of exhaust gas does not meet a predetermined value and the low pressure EGR valve is not in the fully open position, at least one of moving the low pressure EGR valve to the fully open position or decreasing a flow of intake air through the variable swirl device.

8. A method comprising increasing the flow of EGR gas through a low pressure EGR conduit comprising: using a low pressure EGR valve and a variable swirl device, wherein the variable swirl device is positioned in an air intake conduit up stream of a junction of a low pressure EGR conduit and the air intake conduit; determining if the low pressure EGR valve is in a fully open position, if the low pressure EGR valve is not in the fully open position, then moving the low pressure EGR valve to the fully open position, and throttling a flow of intake air through the variable swirl device to decrease the pressure of the intake air at the junction of the low pressure EGR conduit and the air intake conduit, and to swirl intake air and low pressure EGR gas.

9. A method comprising:
providing a computer/controller constructed and arranged to receive one or more inputs regarding operating conditions of the vehicle or constructed and arranged to generate an input based upon at least one of calculations, look-up tables, or models;
and utilizing the computer/controller and at least one input from sources external to the computer/controller or an input from the computer/controller to determine whether enough exhaust gas is flowing through a low pressure exhaust gas recirculation conduit of a vehicle system, and in response to the determination, the computer/controller generating at least one output constructed and arranged to alter the amount of exhaust gas flowing through the low pressure exhaust gas recirculation conduit, and further comprising using the computer/controller to determine if a low pressure exhaust gas recirculation valve is in a completely open position, and if the low pressure exhaust gas recirculation valve is in a completely open position and wherein the generating at least one output constructed and arranged to alter the amount of exhaust gas flowing through the low pressure exhaust gas recirculation conduit comprises decreasing the flow of intake air through a variable swirl device positioned in an air intake conduit up stream of the junction of a low pressure EGR conduit and the air intake conduit.

\* \* \* \* \*